No. 730,604. Patented June 9, 1903.

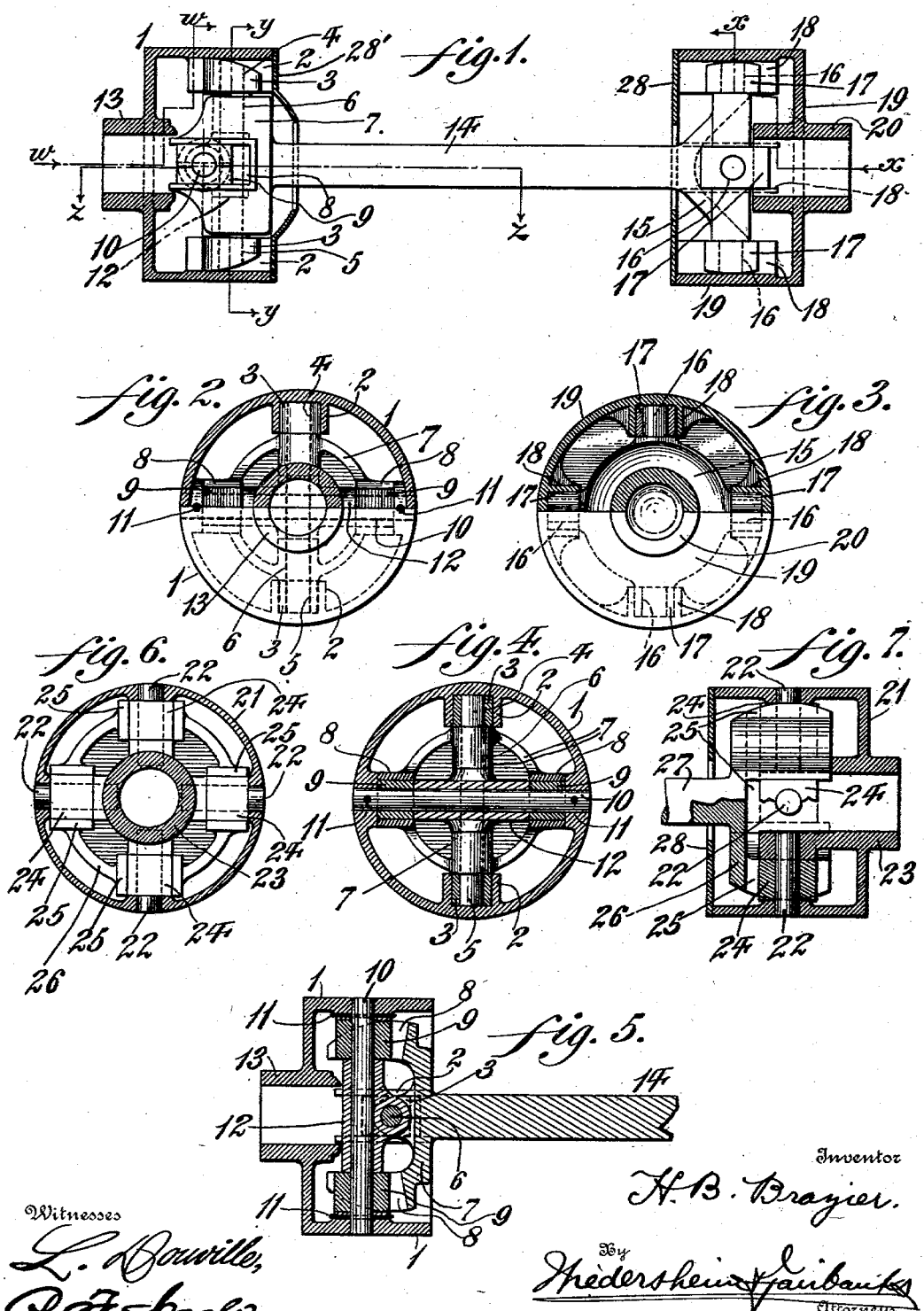

UNITED STATES PATENT OFFICE.

HENRY BARTOL BRAZIER, OF PHILADELPHIA, PENNSYLVANIA.

UNIVERSAL COUPLING.

SPECIFICATION forming part of Letters Patent No. 730,604, dated June 9, 1903.

Application filed August 13, 1902. Serial No. 119,489. (No model.)

*To all whom it may concern:*

Be it known that I, HENRY BARTOL BRAZIER, a citizen of the United States, residing in the city and county of Philadelphia, State of Pennsylvania, have invented a new and useful Improvement in Universal Couplings, of which the following is a specification.

My invention relates to improvements in universal couplings; and it consists in distributing the strain among four points of bearing instead of but two points, and thereby greatly increasing the strength of the joint or coupling.

It further consists of novel details of construction, all as will be hereinafter described and set forth.

Figure 1 represents a partial side elevation and partial vertical section of a universal coupling embodying my invention. Fig. 2 represents a partial end elevation and partial vertical section of certain of the parts seen in Fig. 1, the section being taken on line $w\ w$ in Fig. 1. Fig. 3 represents a partial end elevation and partial vertical section of certain of the parts seen in Fig. 1. The section is taken on line $x\ x$ in Fig. 1. Fig. 4 represents a vertical section on line $y\ y$, Fig. 1. Fig. 5 represents a horizontal section on line $z\ z$ of Fig. 1. Fig. 6 represents a partial end elevation and partial vertical section of a modification of the parts seen in Fig. 2. Fig. 7 represents a partial side elevation and partial vertical section of the parts seen in Fig. 6.

Similar numerals of reference indicate corresponding parts in the figures.

Referring to the drawings, 1 designates a casing provided with the pockets 2, in which are loosely fitted the blocks 3, which are journaled on the end portions 4 and 5 of the pin 6, which latter also passes through a head 7, whereby the blocks 3 are permitted to move longitudinally in the pockets 2 and the head 7 is permitted to move around the pin 6 as an axis. The head 7 is provided with pockets 8, in each of which is loosely fitted a block 9, adapted to be moved longitudinally therein, it being noted that said blocks 9 are loosely mounted on the pin 10, so as to freely turn thereon. The pin 10 is secured to the casing 1 by pins 11, Fig. 2, so as to secure said casing 1 and the pin 10 together, by which means the blocks 8 may turn around the pin 10 as an axis, although said blocks 8 cannot under ordinary conditions be withdrawn from the casing 1. The pin 10 is loosely fitted in a journal-box 12, through which latter also passes the pin 6, as best seen in Fig. 5.

The casing 1 is provided with a hub 13, adapted to receive a shaft to be driven or to drive, as the case may be. The head 7 has projecting therefrom a stem 14, provided with a head 15, from which project radial studs 16, it being noted on referring to Fig. 3 that these are four in number. The studs 16 have loosely journaled thereon the blocks 17, which are loosely fitted in pockets 18 in the casing 19, it being noted that said casing is provided with a hub 20, adapted to receive a shaft either driven or to drive.

It will be apparent on referring to Figs. 1 to 5, both inclusive, that the stem 14 will accommodate itself to any angle relatively to the casings 1 and 19 when these are in operation and that the strain between the driving-shaft and the driven one is distributed among four points in each casing instead of but two points, and thereby greatly increasing the strength of the coupling.

In the modification seen in Figs. 6 and 7 the casing 21 is provided with radial pins 22, which extend into the hub 23 of the casing 21, and on which are journaled the blocks 24, which are free to turn on said pins 22 as an axis, it being noted that the blocks 24 are loosely fitted in pockets 25 in the head 26, from which latter projects the stem 27, which corresponds to the stem 14. (Seen in Figs. 1 and 5).

It is apparent that the operation of the parts seen in Figs. 6 and 7 is substantially the same as the operation of those seen in Fig. 1.

The casings 1, 19, and 21 are provided with caps 28 28', which when secured in position on said casings provide a box or chamber in which any suitable material may be placed to lubricate the several movable parts.

It will be apparent that various changes may be made by those skilled in this art which will come within the scope of my invention, and I do not, therefore, desire to be limited in every instance to the exact construction herein shown and described.

Having thus described my invention, what I claim as new, and desire to secure by Letters Patent, is—

1. In a universal coupling, a casing, a stem, blocks loosely mounted for longitudinal movement and free rotation within said casing, a head in which said blocks are loosely mounted, and a hub.

2. In a universal coupling, a stem, a head thereon, a casing with pockets, a head within said casing and having pockets, blocks fitted within the pockets of the casing, blocks loosely mounted in the pockets of the head and supports on which said blocks are mounted for free rotation.

3. In a universal coupling, a casing with pockets, a head with pockets, blocks fitted in the pockets of the said casing and head, pins on which said blocks are rotatably mounted, means securing said pins and casing together, and a cap on said casing inclosing said parts.

HENRY BARTOL BRAZIER.

Witnesses:
JOHN A. WIEDERSHEIM,
E. HAYWARD FAIRBANKS.